United States Patent [19]

Norman

[11] 4,270,727
[45] Jun. 2, 1981

[54] SPRING LOADED PLUG VALVE

[75] Inventor: Arthur E. Norman, Northridge, Calif.

[73] Assignee: Torr Vacuum Products, Inc., Van Nuys, Calif.

[21] Appl. No.: 959,940

[22] Filed: Nov. 13, 1978

[51] Int. Cl.³ .................. F16K 31/50; F16K 31/122
[52] U.S. Cl. ..................... 251/63.4; 64/29;
251/63.6; 251/87; 251/264; 251/77; 251/318;
251/335 B
[58] Field of Search .................. 251/61.1, 61.2, 61.3,
251/61.4, 61.5, 335 B, 86, 87, 88, 368, 77, 63,
63.4, 63.6, 318, 264; 64/29

[56] References Cited

U.S. PATENT DOCUMENTS

| 1,731,145 | 10/1929 | MacMillin | 251/63.4 |
| 1,799,667 | 4/1931 | Ziegler | 251/87 |
| 2,439,523 | 4/1948 | Miller et al. | 251/63.6 |
| 2,693,822 | 11/1954 | Gerow et al. | 251/335 B |
| 2,872,149 | 2/1959 | Battey et al. | 251/77 |
| 3,087,510 | 4/1963 | Normand, Jr. | 251/177 |
| 3,434,691 | 3/1969 | Hamilton | 251/368 |
| 3,744,751 | 7/1973 | Robinson | 251/335 B |
| 4,102,154 | 7/1978 | Dahlstrand, Jr. | 64/29 |

FOREIGN PATENT DOCUMENTS

| 2234878 | 1/1974 | Fed. Rep. of Germany | 251/335 B |
| 1234306 | 10/1960 | France | 251/335 B |
| 1361534 | 12/1964 | France | 251/335 B |
| 995929 | 6/1965 | United Kingdom | 251/335 B |
| 1373815 | 11/1974 | United Kingdom | 251/61.4 |

Primary Examiner—Martin P. Schwadron
Assistant Examiner—G. L. Walton
Attorney, Agent, or Firm—Keith D. Beecher

[57] ABSTRACT

A valve is provided which includes a poppet enclosed in a plug of plastic material, such as Teflon, and which is biased against a seat by a compression spring so that a positive seal is provided even in the presence of cold flow in the plastic plug. A valve stem engages the poppet, and it serves to pull the poppet and plug away from the seat against the force of the spring when the valve is opened, and to force the poppet and plug against the seat when the valve is closed. The valve may be hand operated, or it may be operated by a pressurized fluid, such as air. An indicator is included in the assembly which provides a readily visible indication of any leakage within the valve housing.

12 Claims, 5 Drawing Figures

SPRING LOADED PLUG VALVE

BACKGROUND

Valves for use with vacuum equipment are essentially different from valves used in conventional systems whose objective is to control the flow of a liquid or gas. In such conventional systems, some leakage of the liquid or gas can usually be tolerated. In the case of vacuum valves, however, even the slightest leak involves not only the loss of a liquid or gas, but total destruction of the vacuum in the vacuum equipment controlled thereby.

The valve of the present invention is intended primarily for use as a vacuum valve in which even the smallest leaks cannot be tolerated. A positive sealing action is assured in the assembly of the present invention when the valve is closed, this being achieved by the use of a Teflon plug which engages a seat in the valve in a leak-free sealing relationship. As described briefly above, the Teflon plug is forced against the seat by the stem of the valve when the valve is closed, and a compression spring also engages the plug, so that it is held in its sealed condition, even in the presence of cold flow of the plastic material.

DETAILED DESCRIPTION OF THE ILLUSTRATED EMBODIMENTS

Figure 1:
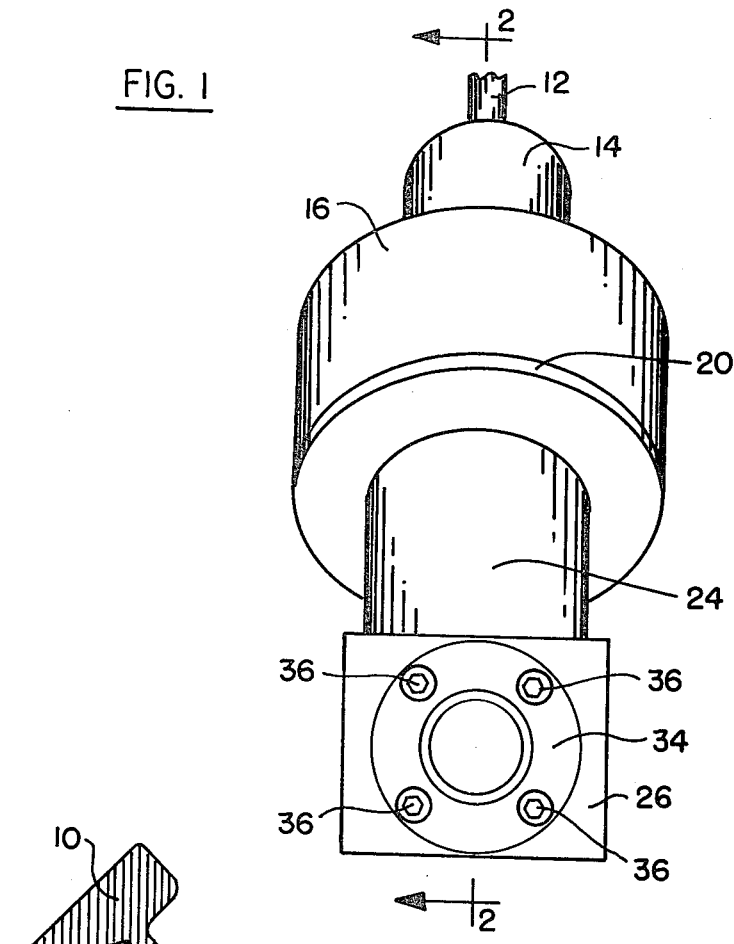
FIG. 1 is an elevational view of a spring biased plug valve constructed in accordance with one embodiment of the invention.
Figure 2:
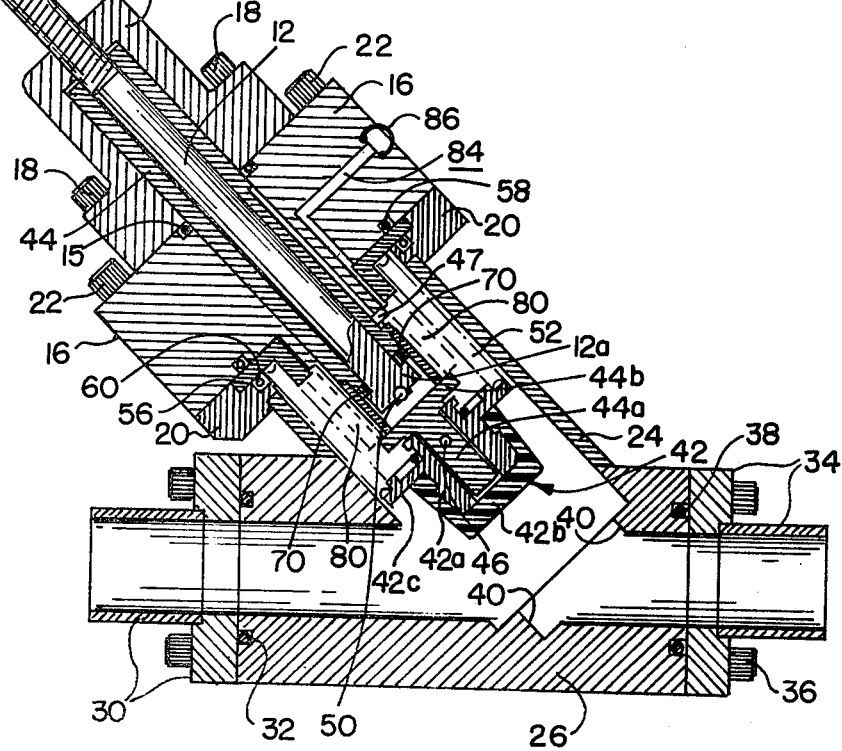
FIG. 2 is a sectional view of the valve of FIG. 1 taken essentially along the line 2—2 of FIG. 1.

The plug valve shown in FIGS. 1 and 2 is hand operated, the valve being opened and closed by turning a knob 10 (FIG. 2) which is mounted on the distal end of a valve stem 12. Stem 12 is threaded to a nut 14 which, in turn, is affixed to the end cap 16 of the valve by screws, such as screws 18. An O-ring seal 15 is interposed between nut 14 and cap 16.

The end cap 16 is attached to the body 20 of the valve by screws, such as screws 22. The body of the valve is fitted over one end of a tube 24 by welding, or other means, and the tube 24 is mounted in an aligned position, such as shown in FIGS. 1 and 2, to a further tube 26 which may, for example, have a rectangular cross-section as shown in FIG. 1. A flange and pipe assembly 30 is attached to one end of the tube 26 by screws (not shown) or other appropriate means, and is sealed thereto by means of an O-ring 32. The flange and pipe assembly 30 constitutes the inlet for the valve. A flange and pipe assembly 34 is attached to the other end of tube 26 by screws, such as screws 36, and is sealed thereto by means of an O-ring 38. The flange and pipe assembly 34 constitutes an outlet for the valve.

The tube 26 has a valve seat 40 formed therein, as shown in FIG. 2, and the valve includes a plug and poppet assembly 42 which fits down into the seat in a sealing relationship. The plug and poppet assembly 42 includes a poppet 42a which is encased in a plug 42b. The plug is formed of appropriate plastic material, such as Teflon.

The valve assembly of FIGS. 1 and 2 includes a sleeve 44 which is slidably mounted in the end cap 16 and body 20 in coaxial relationship with the stem 12, as shown in FIG. 2. Sleeve 44 includes a longitudinal channel which receives a pin 47. Pin 47 serves to prevent rotation of the sleeve. Sleeve 44 has a lower end portion 44a, and the poppet and plug assembly 42 is pivotally mounted on the end portion 44a by means of a pivot pin 46. This pivotal coupling of the plug enables it to move into the seat 40 and engage the seat in sealing relationship as the plug and poppet assembly are moved into the seat so as to close the valve.

A ball 50 is mounted on the end of stem 12, so that when the stem is threaded into the cap nut 14, the ball 50 engages the end portion 44a of the sleeve, and forces the plug and poppet assembly 42 into sealing relationship with the seat 40 to close the valve. A compression spring 52 is mounted in the valve housing, and one end of the spring engages a flange portion 42c of the poppet 42, and the other end of the spring engages an annular retainer 56 which is mounted between the body 16 and 18, and which is sealed thereto by a pair of O-rings 58 and 60.

The spring 52 forces the plug and poppet assembly 42 into its sealing relationship with the valve seat 40, as the knob 10 turns the stem 12 to permit forward motion of the plug and poppet assembly; the stem 12 being coupled to the end of sleeve 44 by virtue of an enlarged end section 12a of the stem which engages a thrust washer 70 which, in turn, engages the end of the sleeve.

A bellows assembly 80 is also mounted between the annular retainer 56 and a flange 44b on sleeve 44. The bellows assembly serves to seal the interior of the assembly from any possible leakage around the sleeve.

The compression spring 52 assures a tight sealing relationship between the plug and poppet assembly 42 and the valve seat 40 when the valve is closed, even in the presence of cold flow of the Teflon plug 42b.

A passageway 84 is provided in the end cap 16, as shown, and the external end of the passageway is covered by a rubber dome-like diaphragm 86. Should a leak occur in the valve assembly, the diaphragm 86 is immediately drawn inwardly to indicate the leakage condition.

The use of the Teflon plug in the valve of the invention assures a complete and leak-proof seal in the valve when the valve is in its closed condition, so that the valve is appropriate for vacuum uses. The use of the spring 52 which exerts a continuous force on the plug and poppet assembly 42 assures that the seal will be maintained, even in the presence of cold flow of the plastic material. Thus, the valve assembly of the invention permits the use of Teflon, or similar material, which is appropriate for sealing conditions, and solves the problem of cold flow in such material.

Figure 3:
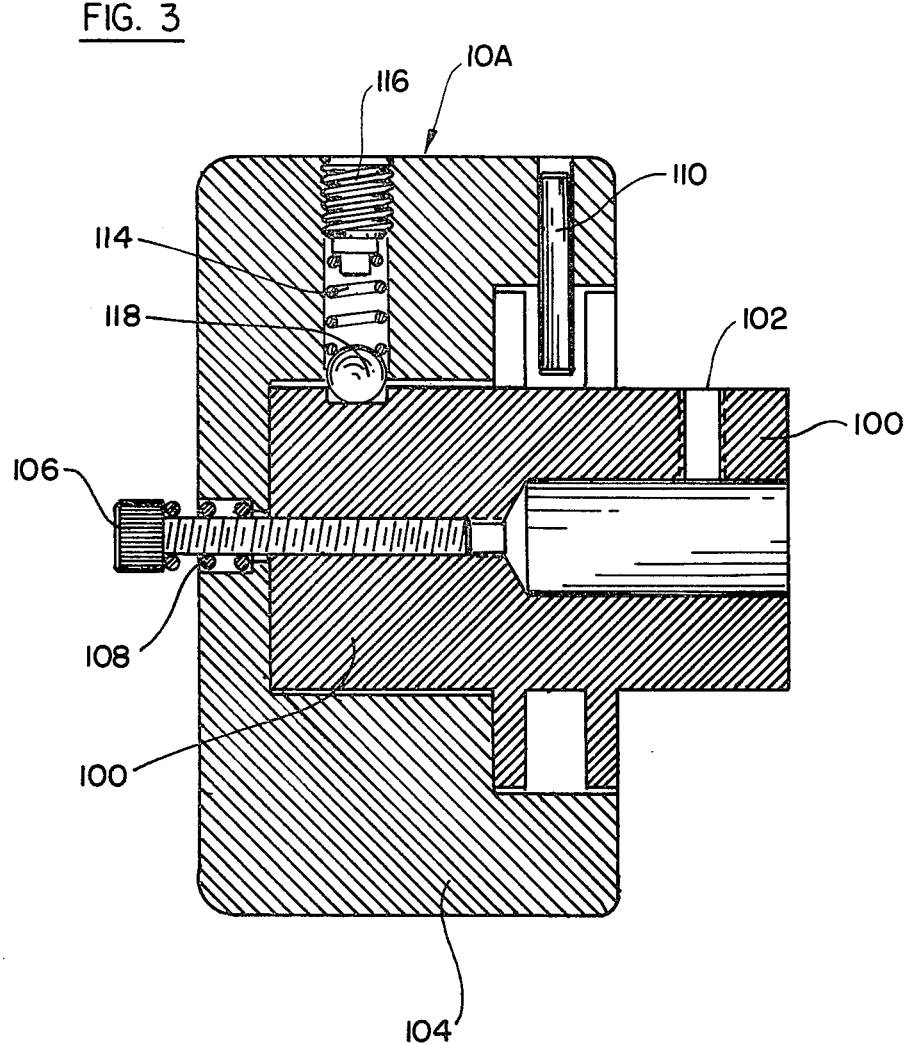
FIG. 3 is a sectional view of a modified knob which may be used to control the valve of FIG. 1, the knob of FIG. 3 including a torque limiting mechanism.

The knob 10 is preferably one which includes a torque limiting mechanism, so that as the knob turns the valve to its closed condition, undue force will not be exerted on the Teflon plug, which could damage the plug. An appropriate knob is shown in FIG. 3, and is designated 10a. The knob 10a includes a hub 100 which is attached to the end of stem 12 by means, for example, of a set screw 102. The knob also includes a handle 104 which is fitted over the end of hub 100, and is held in place by a cap screw 106 which is threaded into the end of the handle, and which serves as a support for an internal spring 108 which extends into the end of the hub.

The handle 104 includes a radial passage, and a roll pin 110 is press-fit in the passage to serve as a retainer for retaining the handle on the hub. The handle also has a second radial passage, and a spring 114 is held in the second passage by a set screw 116, the spring bearing against a ball 118 which is received in detents in the hub 100. The pressure exerted by spring 114 may be controlled by adjusting the set screw 116, and the assembly may be set so that the hub 100 is turned when the handle 104 is turned until a predetermined torque threshold is reached, at which time the ball 118 moves from one detent to another in the hub.

Figure 4:
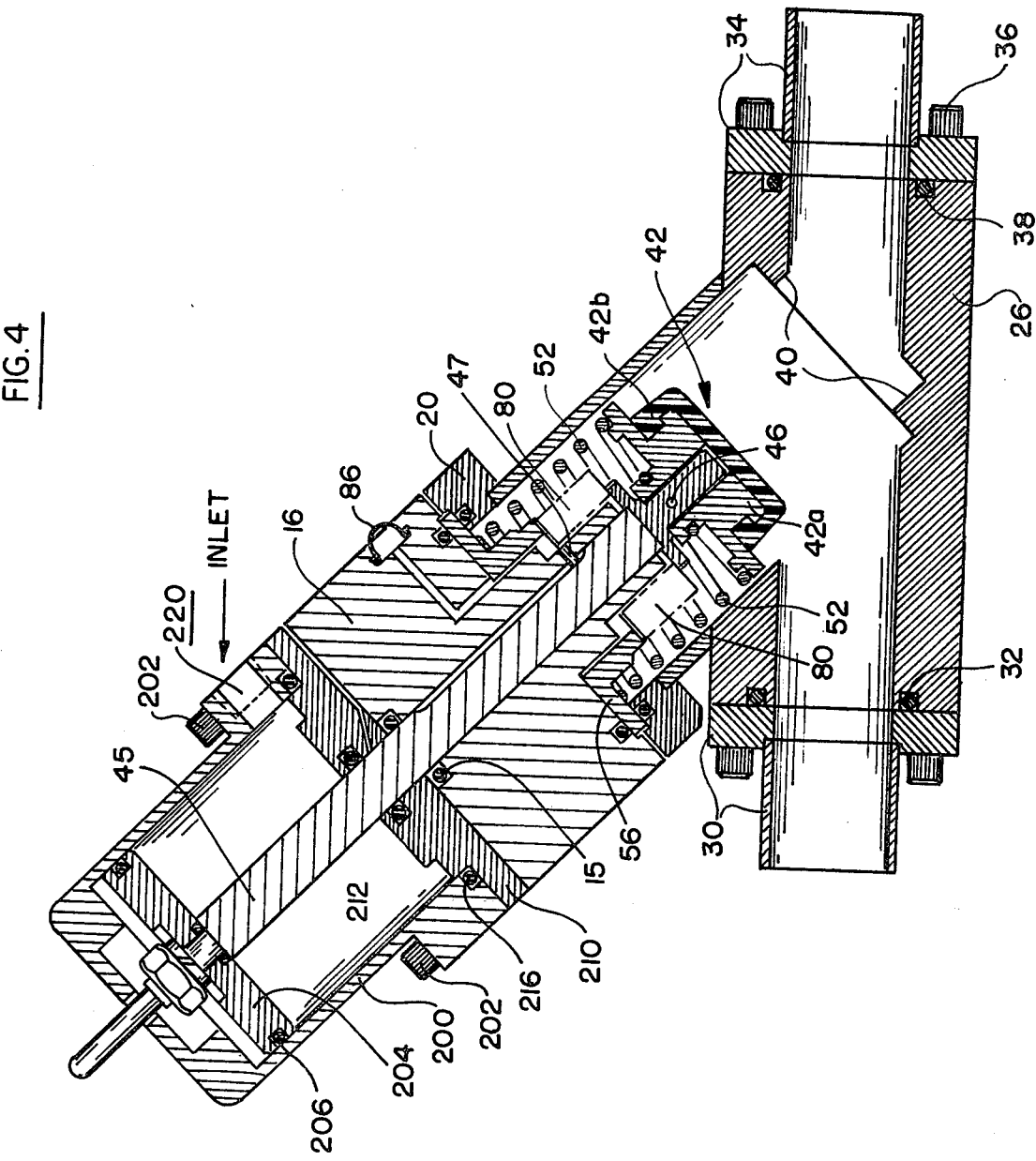
FIG. 4 is a sectional view, like the section of FIG. 2, and representing a modified valve which is controlled by pressurized fluid, and which is normally closed.

The valve assembly of FIGS. 1 and 2 is hand operated. The valve assembly of FIG. 4 is similar to the hand operated valve assembly, except that the assembly of FIG. 4 is operated by a pressurized fluid (such as compressed air) which, when introduced into the assembly causes the valve to open. In the assembly of FIG. 4, components similar to the components of FIGS. 1 and 2 are designated by the same numerals.

In the embodiment of FIG. 4, a cylinder 200 is mounted to the end cap 16 by screws such as screws 202, and a piston shaft 45 extends into the cylinder, and is connected to a piston 204. Shaft 45, like sleeve 44, has a longitudinal channel which receives pin 47 to prevent rotation of the shaft. The piston is sealed to the inner wall of the cylinder by an O-ring 206. The cylinder includes a front plate 210 which is interposed between the end of the cylinder and the cap 16. The shaft 45 extends through the end plate, and is sealed thereto by an O-ring 212. The end of the cylinder is sealed to the end plate by an O-ring 216.

The cylinder includes an inlet 220 through which a pressurized fluid, such as compressed air is introduced. The assembly of FIG. 4 is normally in a closed condition, during which the spring 52 forces the plug assembly 42 into the seat 40. However, when pressurized fluid is introduced through the inlet 220 it forces piston 204 to the position shown in the drawing, and moves the plug assembly 42 against the force of spring 52 to set the valve to its illustrated open position.

Figure 5:
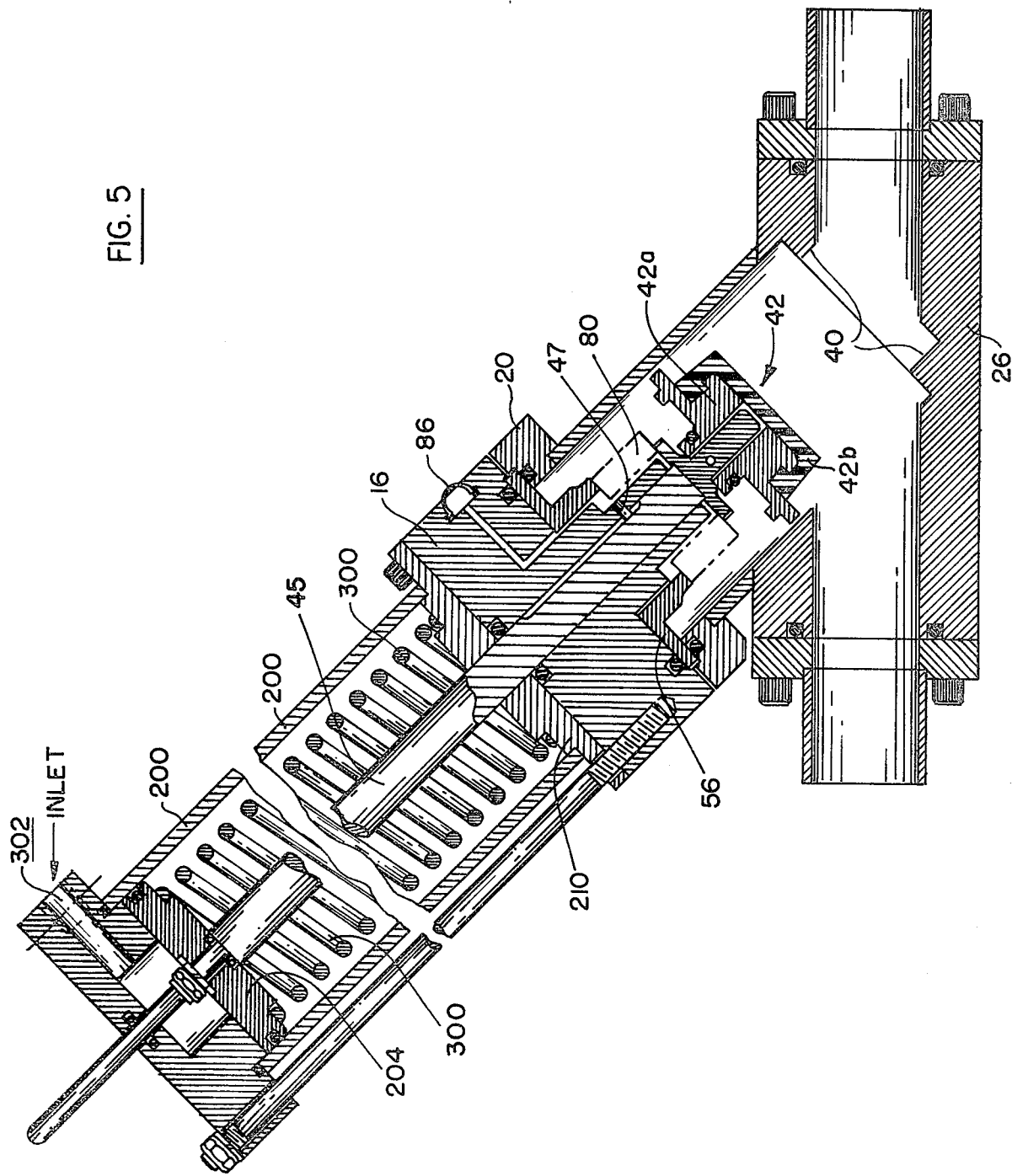
FIG. 5 is a sectional view, like the views of FIGS. 2 and 4, of a further embodiment which, like the embodiment of FIG. 3 is controlled by pressurized fluid, but which is normally open.

The valve assembly of FIG. 5 is generally similar to that of FIG. 4, and like elements have been designated by the same numbers. In the assembly of FIG. 5, a spring 300 is included in the cylinder 200 to move the valve to its illustrated open position. Spring 300, as illustrated, is positioned between the end plate 210 and the piston 204. The embodiment of FIG. 5 includes an inlet 302 through which the pressurized fluid is introduced to force the piston 204 down towards the end plate 210 to cause the plug assembly 42 to enter the seat 26 and close the valve against the force of spring 300.

The invention provides, therefore, an improved plug valve assembly which is particularly adaptable for uses in conjunction with vacuum applications.

It will be appreciated that while particular embodiments of the invention have been shown and described, modifications may be made. It is intended in the claims to cover the modifications which come within the spirit and scope of the invention.

What is claimed is:

1. A valve assembly including: a housing defining an inlet and an outlet, and further defining a seat positioned within the housing between the outlet and the inlet; a poppet valve mounted in the housing and movable between an open position displaced from said seat and a closed position; a plastic plug member secured to said poppet valve for engaging said seat in sealed relationship therewith when the poppet valve is closed; an elongated member reciprocally movable in said housing along a linear axis; first means coupling one end of said elongated member to said poppet valve; second means coupled to said elongated member for pulling said poppet valve to its open position and for moving said poppet valve to its closed position; and resilient means coupled to said poppet valve for maintaining a positive force on said poppet valve when said poppet valve is in its closed position in the presence of any deformation of said plastic plug said elongated member comprises a sleeve, said second means includes a stem movably mounted in said housing and extending through said sleeve in coaxial relationship with said sleeve, said stem has an enlarged end section for coupling said stem to said one end of said sleeve to enable the stem to pull the poppet valve to its open position, the movement between the end of the sleeve and the enlarged section provides lost motion, and the enlarged section abuts the end of said sleeve to lock said poppet valve in said closed position.

2. The valve assembly defined in claim 1, in which said first means includes a pivot pin for coupling said one end of said elongated member to said poppet valve.

3. The valve assembly defined in claim 1, in which said plastic material is Teflon.

4. The valve assembly defined in claim 1, and which includes ball means mounted on one end of said stem for engaging the end of said sleeve.

5. The valve assembly defined in claim 1, and which includes a nut member mounted on said housing, and in which said stem is threaded into the nut member.

6. The valve assembly defined in claim 5, and which includes a manually-operable knob coupled to the distal end of said stem.

7. The valve assembly defined in claim 6, and which includes torque limiting means mounted in said knob.

8. The valve assembly defined in claim 1, in which said housing includes a passageway extending from the interior to the exterior thereof, and which includes a diaphragm mounted across the external end of the passageway to indicate leakage into the interior of the housing.

9. The valve assembly defined in claim 8, in which the pressurized fluid in said cylinder means causes said piston to move said elongated member in a direction to move said poppet valve away from said seat.

10. The valve assembly defined in claim 1, and which includes cylinder means, a piston coupled to said elongated member and movable in said cylinder means, and means for introducing pressurized fluid into the cylinder means for causing said elongated member to move within the valve housing.

11. The valve assembly defined in claim 10, in which said pressurized fluid causes said piston to move said elongated member in a direction to move the poppet valve against said seat and also to constitute said resilient means for maintaining a positive force on said poppet valve.

12. The valve assembly defined in claim 11, and which includes further spring means mounted in said cylinder means and engaging the piston to move the elongated member in a direction to cause the poppet valve to move away from said seat when the pressurized fluid is released from said cylinder means.

* * * * *